(12) United States Patent  
Buuck et al.

(10) Patent No.: US 8,295,037 B1  
(45) Date of Patent: Oct. 23, 2012

(54) HINGED ELECTRONIC DEVICE HAVING MULTIPLE PANELS

(75) Inventors: David C. Buuck, Santa Clara, CA (US); Joseph J. Hebenstreit, San Francisco, CA (US); Kenneth M. Karakotsios, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 244 days.

(21) Appl. No.: 12/720,028

(22) Filed: Mar. 9, 2010

(51) Int. Cl.  
*G06F 1/16* (2006.01)

(52) U.S. Cl. .................................. 361/679.01

(58) Field of Classification Search ............ 361/679.01  
See application file for complete search history.

(56) References Cited

U.S. PATENT DOCUMENTS

| | | | | |
|---|---|---|---|---|
| 5,417,575 A * | 5/1995 | McTaggart | .................... | 434/317 |
| 5,534,888 A * | 7/1996 | Lebby et al. | .................. | 345/672 |
| 5,847,698 A * | 12/1998 | Reavey et al. | ................ | 345/173 |
| 6,229,502 B1 * | 5/2001 | Schwab | ......................... | 345/1.1 |
| 6,313,828 B1 * | 11/2001 | Chombo | ....................... | 345/169 |
| 7,548,220 B2 * | 6/2009 | Silverbrook | ................... | 345/1.3 |
| 7,864,517 B2 * | 1/2011 | Miller et al. | ............. | 361/679.27 |
| 2004/0046705 A1 * | 3/2004 | Masazumi et al. | ............. | 345/1.1 |
| 2004/0049743 A1 * | 3/2004 | Bogward | ....................... | 715/531 |
| 2004/0212602 A1 * | 10/2004 | Nako et al. | ..................... | 345/173 |
| 2006/0187142 A1 * | 8/2006 | Lesniak | ......................... | 345/1.1 |
| 2007/0182663 A1 * | 8/2007 | Biech | .............................. | 345/1.1 |
| 2007/0279315 A1 * | 12/2007 | Laves et al. | ..................... | 345/1.1 |
| 2008/0076103 A1 * | 3/2008 | Wallace | ......................... | 434/317 |
| 2008/0298083 A1 * | 12/2008 | Watson et al. | ................ | 362/603 |
| 2009/0201223 A1 * | 8/2009 | Stephens | ........................ | 345/1.3 |
| 2010/0129782 A1 * | 5/2010 | Milne et al. | .................... | 434/317 |
| 2010/0161653 A1 * | 6/2010 | Krasnow | ....................... | 707/769 |
| 2010/0225268 A1 * | 9/2010 | Hui | ................................ | 320/101 |
| 2010/0245209 A1 * | 9/2010 | Miller et al. | ..................... | 345/1.3 |
| 2011/0002096 A1 * | 1/2011 | Thorson | ................... | 361/679.04 |
| 2011/0066965 A1 * | 3/2011 | Choi | .............................. | 715/776 |
| 2011/0102314 A1 * | 5/2011 | Roux | ............................. | 345/156 |
| 2011/0128216 A1 * | 6/2011 | Renwick | ....................... | 345/156 |

* cited by examiner

*Primary Examiner* — Lisa Lea Edmonds  
(74) *Attorney, Agent, or Firm* — Lee & Hayes, PLLC

(57) ABSTRACT

An electronic device, such as an electronic book ("eBook") reader device, is configured with two panels connected via a hinge. A first panel includes components such as a battery, a main logic board, a wireless networking interface, and so forth while a second panel includes a display component such as an electrophoretic display. The panels may be opened for use wherein the display is visible to a user, or closed such that the first panel protects and/or obscures the second panel and the display located therein.

27 Claims, 17 Drawing Sheets

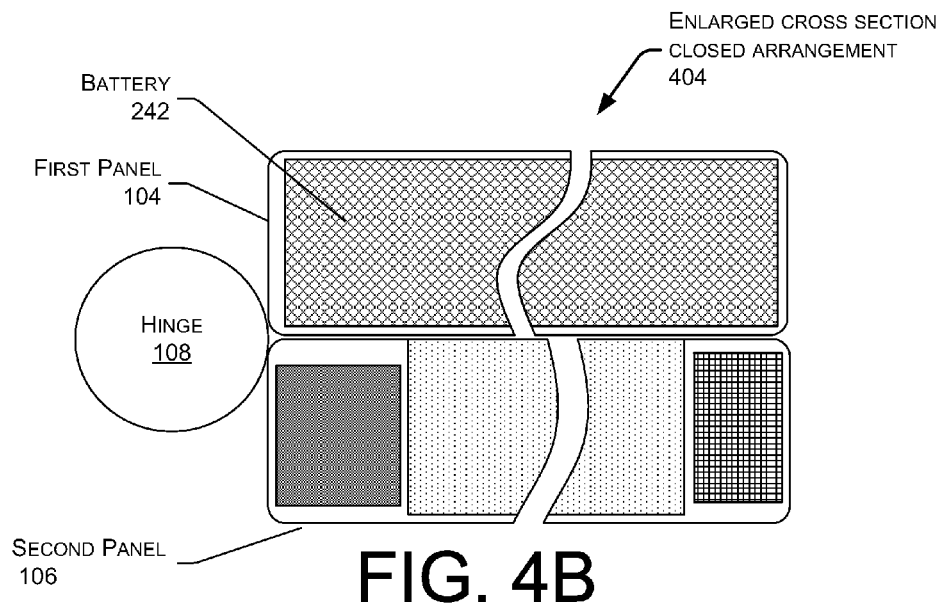
FIG. 4B
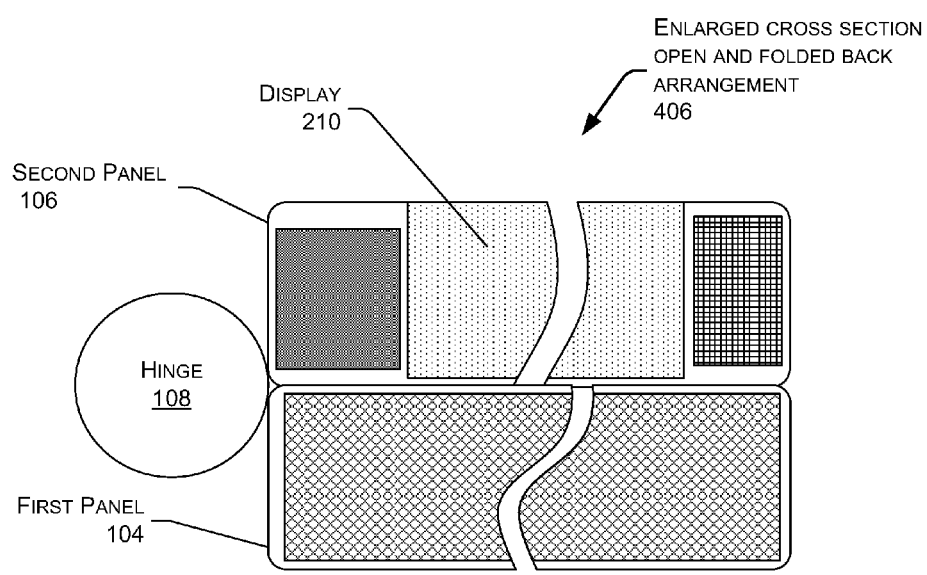
FIG. 4C
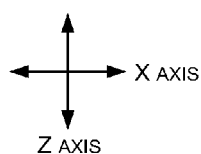

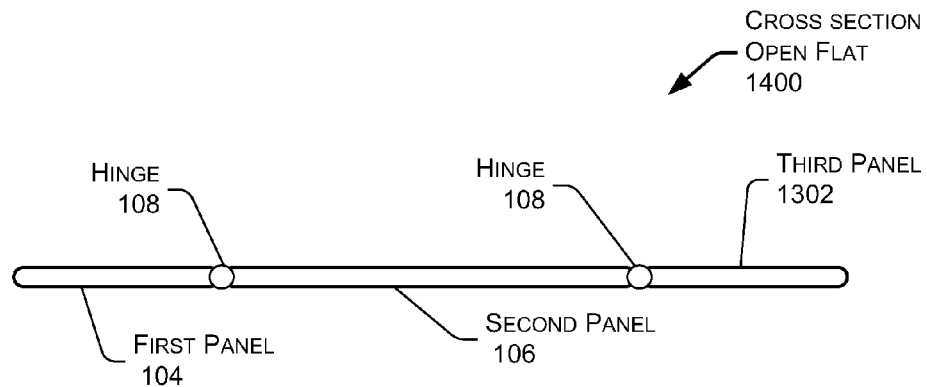
FIG. 14A
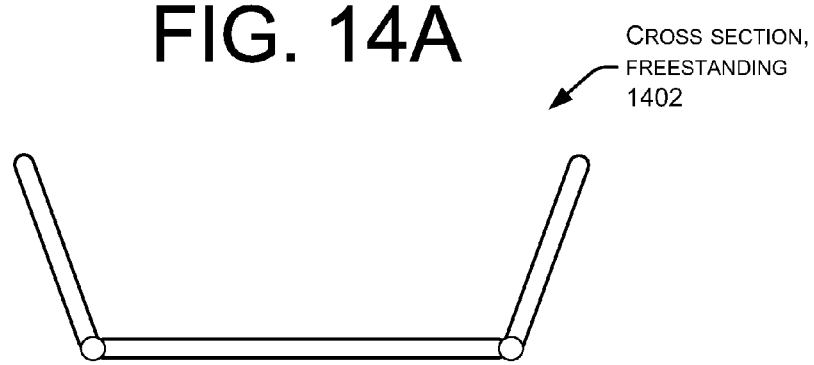
FIG. 14B
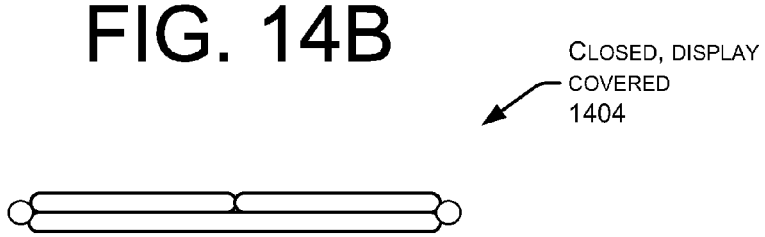
FIG. 14C
FIG. 14D
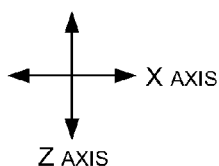

HINGED ELECTRONIC DEVICE HAVING MULTIPLE PANELS

BACKGROUND

Electronic book ("eBook") reader devices may be used in a variety of situations, ranging from a casual reader sitting in their living room to students in a classroom. Covers may be provided for these devices for several reasons, including to protect a relatively delicate display component from inadvertent damage during storage or transport. Traditionally, covers for these devices are non-functional, and add unwanted bulk to the devices.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 1A illustrates the eBook reader device in an open state, while FIG. 1B illustrates the device in a closed state.

FIGS. 4A-4C illustrate enlarged cross sections of the eBook reader device of FIG. 3 in three physical arrangements.

FIGS. 14A-14D illustrate cross sections of the eBook reader device of FIG. 13 in various physical arrangements.

DETAILED DESCRIPTION

Overview

Electronic book ("eBook") reader devices are used in a variety of situations, ranging from a casual reader sitting in their living room to students in a classroom. Covers may be provided for these devices for several reasons, including to protect a relatively delicate and often expensive display component from inadvertent damage during transport or storage. For example, a cover may help prevent scratching or gouging of an eBook reader device shoved into a student's backpack or into a traveler's carry-on bag.

However, covers add unwanted bulk to the devices without providing functional capabilities to the device. Thus, traditional eBook reader covers do not provide support for functional capabilities such as power, computational, networking, and so forth.

This disclosure describes, in part, hinged, multiple-panel devices having active components stored within the panels and techniques for assembling these devices. Active components are those which consume, store, or produce electrical power.

When a display of the device is not in use, the panels may be folded together via a hinge, closing the device. When in the closed state, a first panel containing one or more operational components may protect and/or obscure the display which is positioned on a second panel. Thus, when the device is closed, a slim profile is achieved while protecting the display of the device.

Illustrative Hinged, Multiple-Panel Device

Figure 1A:
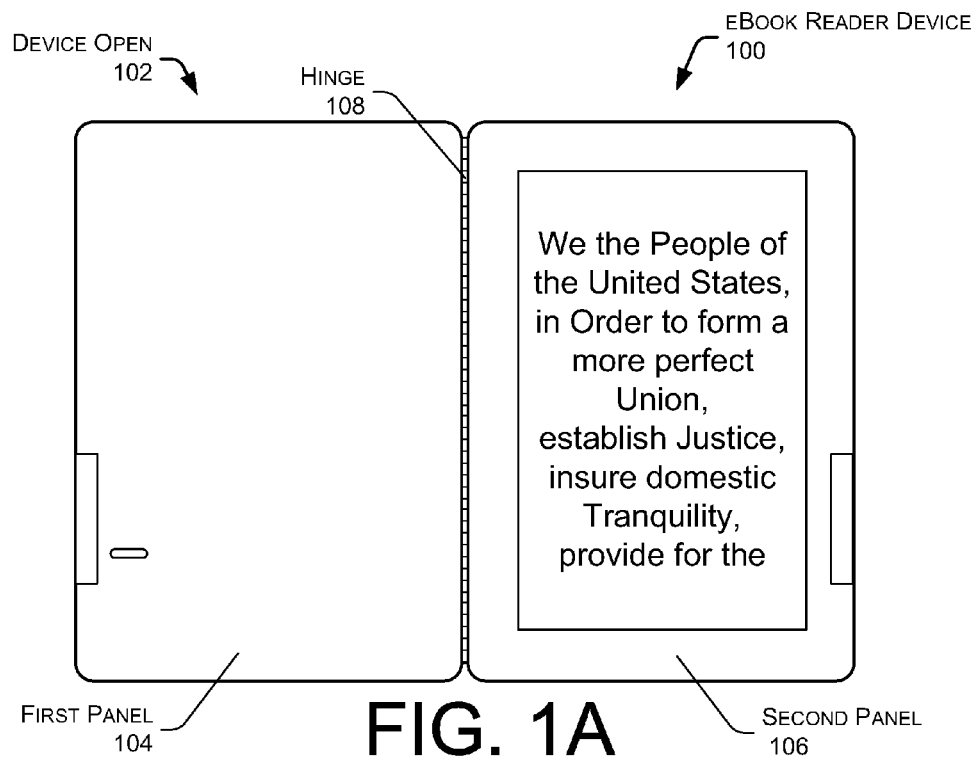
FIGS. 1A and 1B depict an illustrative electronic book ("eBook") reader device having two panels connected via a hinge with each panel containing active components of the device.
Figure 1B:
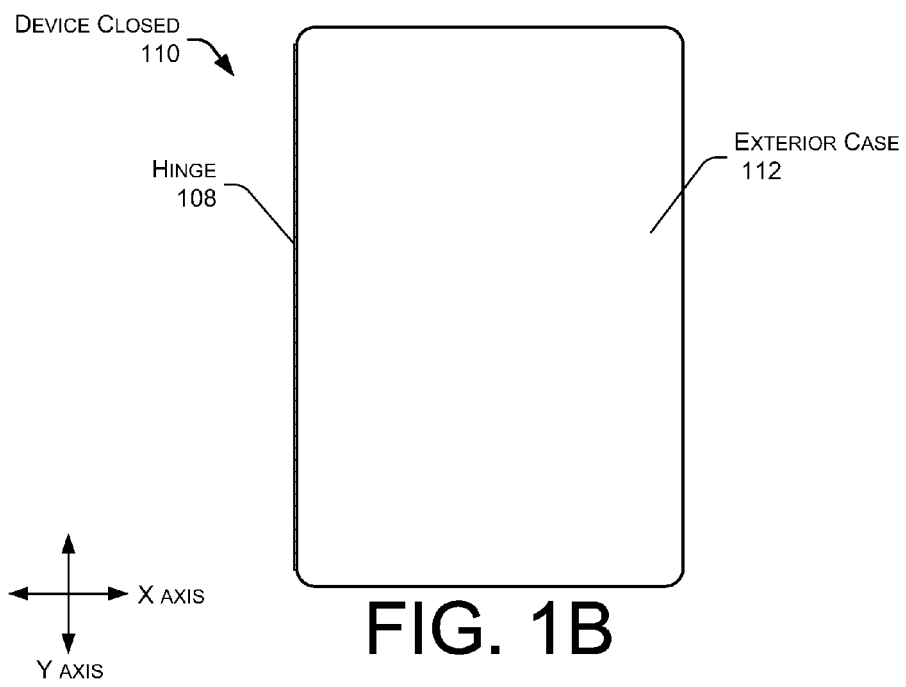

FIGS. 1A and 1B depict an illustrative eBook reader device 100. In FIG. 1A, eBook reader device 100 is shown in a device open state 102. A first panel 104 on the left is coupled to a second panel 106 on the right via a hinge 108.

As shown in FIG. 1B, the hinge is configured such that the first panel 104 and second panel 106 may be moved respective to one another such that the first panel 104 overlays and/or obscures the second panel 106 when the device is in a closed state 110. Thus, an exterior case 112 of the first panel 104 services to protect and/or obscure the second panel 106, as well as components within the interior of the second panel 106, such as a display component. This protection is useful in many environments, such as an in an educational environment to minimize damage by a student user who stows or retrieves the device in a backpack or the like.

While FIG. 1 and proceeding figures illustrate an eBook reader device 100, other devices may similarly utilized multiple panels connected by a hinge. These devices include cellular phones, portable media players, tablet computers, netbooks, laptops, and so forth. Furthermore, while two panels are shown, in other implementations three, four, and more panels may be present. For example, three panels may be arranged with a display component on two or more panels and configured to fold such that the display components are protected when in a closed state. Furthermore, other implementations may employ any other number of hinges, depending upon numerous factors including the number of panels of the device.

Figure 2:
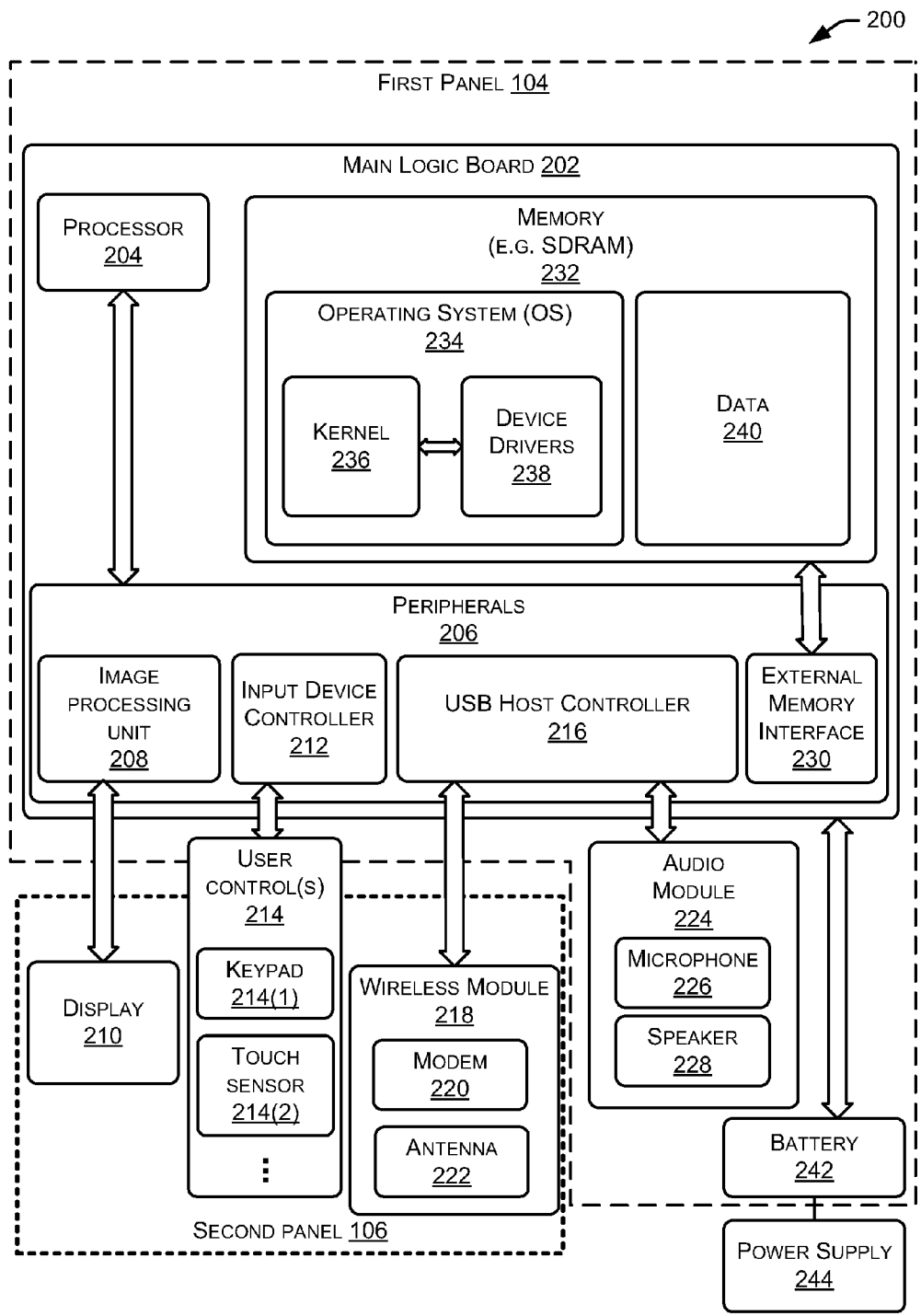
FIG. 2 is an illustrative schematic of an electronic device showing an example distribution of components across two panels.

FIG. 2 is an illustrative schematic 200 of an electronic device, such as the eBook reader device 100, showing distribution of components across two panels. While this figure illustrates certain components in certain locations within the panels, these components may reside in any other combination of one or more panels in any other manner in different implementations.

In a very basic configuration, the device 100 includes a backplane such as a main logic board 202 comprising components such a processor 204 and one or more peripherals 206. Each processor 204 may itself comprise one or more processors. In this example, the main logic board 202 is located within the first panel 104. The backplane may comprise a printed circuit board or other substrate to which one or more components are affixed.

Peripherals 206 may be coupled to the processor 204. In some implementations, at least some of the peripherals 206 may be located on the main logic board 202. An image processing unit 208 is shown on the main logic board 202 coupled to one or more display components 210 (or "displays"). In this example, this display 210 is located within the second panel 106 of the eBook reader device 100. In some implementations, multiple displays may be present and coupled to the image processing unit 208. These multiple displays may be located in the same or different panels. Furthermore, one or more image processing units 208 may couple to the multiple displays.

Display 210 may present content in a human-readable format to a user. The display 210 may be reflective, emissive, or a combination of both. Reflective displays utilize incident light and include electrophoretic displays ("EPD"), interferometric modulator displays, cholesteric displays, and so forth. Emissive displays do not rely on incident light and, instead, emit light. Emissive displays include backlit liquid crystal displays, time multiplexed optical shutter displays, light emitting diode displays, and so forth. When multiple displays are present, these displays may be of the same or different types. For example, one display may be an electrophoretic display while another may be a liquid crystal display.

The content presented on the display 210 may take the form of electronic books or "eBooks." For example, the display 210 may depict the text of the eBooks and also any illustrations, tables, or graphic elements that might be contained in the eBooks. The terms "book" and/or "eBook", as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, and so forth. Accordingly, the terms "book" and/or "eBook" may include any readable or viewable content that is in electronic or digital form.

The display 210 may further include touchscreen capabilities that allow user input through contact or gesturing relative to the display 210. For convenience only, the display 210 is shown in a generally rectangular configuration. However, it is understood that the display 210 may be implemented in any shape, and may have any ratio of height to width. Also, for stylistic or design purposes, the display 210 may be curved or otherwise non-linearly shaped. Furthermore, the display 210 may be flexible and configured to fold or roll.

EBook reader device 100 may have an input device controller 212 configured to accept input from one or more user actuable controls 214. These user actuable controls may include a keypad 214(1), keyboard, joystick, touch sensor 214(2) which may be a touch pad or incorporated into a display to form a touchscreen, and so forth. These user actuable controls 214 may have dedicated or assigned operations. For instance, the actuatable controls may include page turning buttons, a joystick, navigational keys, a power on/off button, selection keys, touch sensor, and so on. The user controls 214 may be located on the main logic board 202 or on other circuit boards or structures within the eBook reader device 100.

The touch sensor 214(2) may include force sensitive resistor arrays, surface capacitive arrays, projected capacitive arrays, and so forth. The touch sensor 214(2) may be configured to determine proximity, contact, magnitude of contact, and so forth of objects including fingers and styli.

A USB host controller 216 may also be located on the main logic board 202. The USB host controller 216 manages communications between devices attached to a universal serial bus ("USB") and the processor 204 and other peripherals.

The USB host controller 216 may be coupled to a wireless module 218 via the universal serial bus. Wireless module 218 may allow for connection to wireless local or wireless wide area networks ("WWAN"). Wireless module 218 may include a modem 220 configured to send and receive data wirelessly and one or more antennas 222 suitable for propagating a wireless signal. In other implementations, a wired network interface may be provided. As illustrated here, the wireless module 218 may be located in the second panel 106 with the display 210, while in other implementations the wireless module 218 may be located in the first panel 104.

The USB host controller 216 may also be coupled to an audio module 224. Audio module 224 may include a microphone 226, one or more speakers 228, and so forth. In some implementations, audio module 224 may be a separate sub-enclosure separate from the main logic board 202.

An external memory interface ("EMI") 224 located on main logic board 202 is also shown coupled to external memory 232. The EMI 224 manages access to data stored in external memory 232. The external memory 232 may comprise Static Random Access Memory ("SRAM"), Pseudo-static Random Access Memory ("PSRAM"), Synchronous Dynamic Random Access Memory ("SDRAM"), Double Data Rate SDRAM ("DDR"), Phase-Change RAM ("PCRAM"), or other computer readable storage media. External memory 232 may be located on main logic board 202 as shown, on another circuit board, or a combination of the two.

External memory 232 may also store data 240, which may comprise content objects for consumption on eBook reader device 100, executable programs, databases, user settings, configuration files, device status, and so forth. Thus, memory 232 may store an operating system 234 comprising a kernel 236 operatively coupled to one or more device drivers 238. Device drivers 238 are also operatively coupled to peripherals 206. Furthermore, eBook reader device 100 may include one or more other, non-illustrated peripherals, such as a hard drive using magnetic, optical, or solid state storage to store information, a firewire bus, a Bluetooth™ wireless network interface, camera, global positioning system, PC Card component, and so forth.

One or more batteries 242 provide operational electrical power to components of the eBook reader device 100 for operation when the device is disconnected from an external power supply 244. Operational electrical power is sufficient to provide for operation of the device, as distinguished from the lesser electrical power requirements of a sleep or state retention mode. Power supply 244 may be internal or external to the eBook reader device 100. Power supply 244 is configured to provide operational power for eBook reader device 100, to charge battery 242, or both. "Battery" as used herein includes components capable of providing power to an electronic device, including lithium polymer batteries, ultracapacitors, fuel cells, and so forth.

One or more of the batteries 242 may reside within in one or more panels of the eBook reader device 100. In this illustration, battery 242 is located within the first panel 104 with the main logic board 202.

Couplings, such as that between input device controller 212 and user controls 214, are shown for emphasis. There are couplings between many of the components illustrated in FIG. 2, but graphical arrows are omitted for clarity of illustration.

Figure 3:
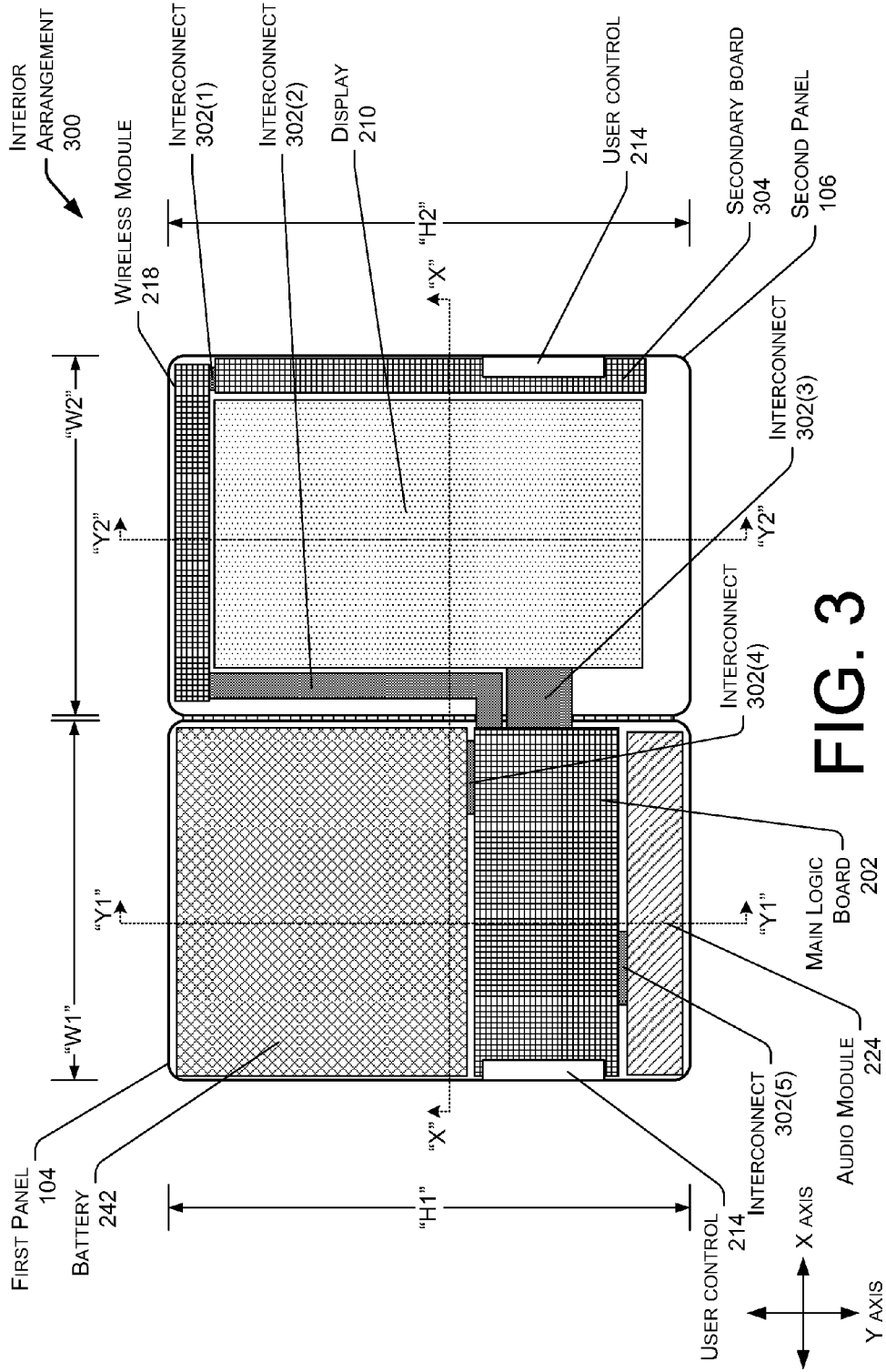
FIG. 3 is an illustration of an example internal arrangement of components of the eBook reader device of FIG. within the panels.

FIG. 3 is an illustration of an example internal arrangement 300 of the eBook reader device of FIG. 1, showing placement of components within the first panel 104 and second panel 106. The first panel 104 here includes the battery 242, the main logic board 202, the audio module 224, and the user control 214. The battery 242 is coupled to the main logic board 202 via an interconnect 302(4).

The second panel 106 includes the display 210 in this example. Disposed above the display 210 is the wireless module 218. To the right of display 210, a secondary board 304 is depicted with a user control 214, such as a page turn button. The secondary board 304 may house components necessary for the user control 214, additional components, or both.

FIG. 3 also illustrates one or more interconnects 302, which provide pathways for coupling components located in different component bays. Interconnects may include an electrical conductor, an optical path, electromagnetic waveguides, fluidic channels, magnetic couplings, mechanical couplings, and so forth. For example, interconnect 302(1) provides an electrical connection between the secondary board 304 and the wireless module 218. Interconnect 302(2) couples the wireless module 218 to the main logic board 202. Interconnect 302(3) couples the display 210 with the main logic board 202, while interconnect 302(4) provides a coupling between the main logic board 202 and the battery 242. Finally, interconnect 302(5) couples the audio module 224 with the main logic board 202. In some implementations, interconnects may be integral to components. For example, the wireless module 218 may incorporate electrical conductors suitable to act as an interconnect between the secondary board 304 and the main logic board 202. In another example, layers within the display 210 may provide interconnects 302. Interconnects 302 may be rigid, flexible, elastomeric, and so forth.

Interconnects may be arranged to pass at least partially in front of, behind, or otherwise proximate to components. For example, the interconnect 302(2) between the main logic board 202 and the wireless module 218 may run at least partially behind the display 210. In another example, an interconnect may extend at least partially behind the display 210 from the main logic board 202 to the secondary board 304.

An exterior case 112 for each panel at least partially encloses the components. The exterior case may be a pre-existing structure of one or more parts, configured to accept the components. In other implementations, the components may be at least partially encased in an encapsulating material, such as a plastic or epoxy.

FIG. 3 also illustrates cross sectional lines "X," "Y1," and "Y2." Cross sectional line "X" along an X axis is depicted at approximately the middle of the device 100 and is perpendicular to the long axes of the first panel 104 and second panel 106. Cross sectional lines "Y1" and "Y2" along a Y axis are depicted at approximately the center of the first panel 104 and second panel 106, respectively, and are perpendicular to the cross sectional line "X."

Several dimensions are also illustrated. A height "H1" of the first panel 104 along the Y axis is shown, as is a height "H2" of the second panel 106, also along the Y axis. While H1 and H2 are shown in this illustration as being about the same, in some implementations these dimensions may differ. For example, the first panel 104 may be taller than the second panel 106 or vice versa in certain implementations.

FIG. 3 also illustrates widths of the panels. A width "W1" of the first panel 104 along the X axis is shown, as is a width "W2" of the second panel 106. While W1 and W2 are shown in this illustration as being about the same, in some implementations these dimensions may differ. For example, the first panel 104 may be wider than the second panel 106 or vice versa in certain implementations.

Figure 4A:
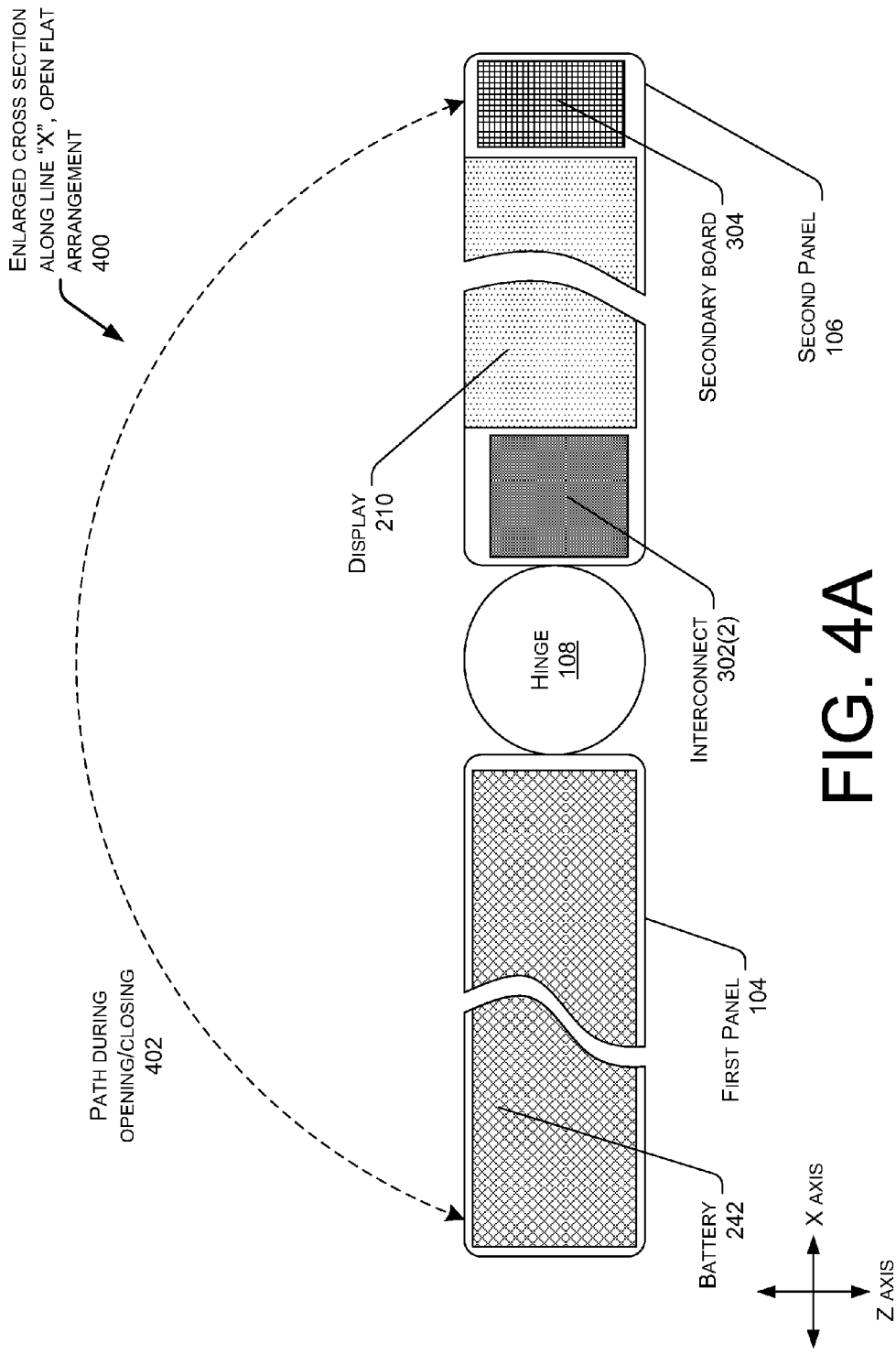

FIGS. 4A-4C illustrate enlarged cross sections of the eBook reader device of FIG. 3 along line "X." FIG. 4A shows an open flat state 400. In this cross section, the battery 242 is visible within the first panel 104. In some implementations, the battery 242 and the main logic board 202 may be substantially coplanar. That is, the battery 242 and the main logic board 202 may be located within about the same plane.

A plane of the battery 242, the main logic board 202, and other active components may be defined by the length and width of the component. For example, in one implementation the battery 242 may be about 150 millimeters long (as measured along the Y axis), about 200 mm wide (as measured along the X axis), and about 1 mm high (as measured along the Z axis). Thus, the plane of the battery 242 is defined by the axis which is 150 mm long and the axis which is 200 mm wide. In other words, in one implementation the top two longest linear dimensions of the component which are orthogonal to one another define the plane.

Returning to FIG. 4, for example, the battery 242 and main logic board 202 may abut one another, rather than being stacked at least partially atop one another. Such a substantially coplanar arrangement provides a further benefit of reducing the height, or overall dimension along the Z axis of the panel.

The hinge 108 is shown providing the coupling between the first panel 104 and the second panel 106. While a single continuous hinge (or "piano hinge") is shown, in some implementations one or more individual hinges may be used to couple the panels. For example, barrel hinges, living hinges, and so forth may connect the panels.

In some implementations, the hinge 108 may include integral interconnects. For example, a living hinge may incorporate flexible circuit traces, and thus act as both a hinge and interconnect.

Within the second panel 106, the display 210 is positioned between the interconnect 302(2) and the secondary board 304. This figure also illustrates, with broken line 402, a path traced by the panels upon opening and closing the device 100. The opening and closing may be entirely manual, that is performed by a user, or assisted at least partially by a mechanism such as a spring, actuator, and so forth.

As with the first panel, in some implementations the active components within the second panel may be substantially coplanar to one another. For example, the display 210 may be coplanar with other components in the second panel, such as the wireless module 218 and the secondary board 304.

FIG. 4B shows a cross section of the eBook reader device 100 in a closed state 404. In this cross section, the battery 242 is visible within the first panel 104. The first panel 104 has been rotated about the hinge 108 to cover the second panel 106. In the closed state 404, the display 210 is protected by the first panel 104. Thus, in the closed state the eBook reader device 100 may be placed into a student's backpack without concern for damaging the display 210.

FIG. 4C shows a cross section of the eBook reader device 100 in an open and folded back state 406. In this cross section, the second panel 106 including display 210 is visible to a user. The first panel 104 has been rotated about the hinge 108 to place the first panel 104 behind the second panel 106. Thus, in this configuration the user may continue to view content upon the display, while having a smaller overall footprint of the device as compared to the open flat state 400.

Figure 5:
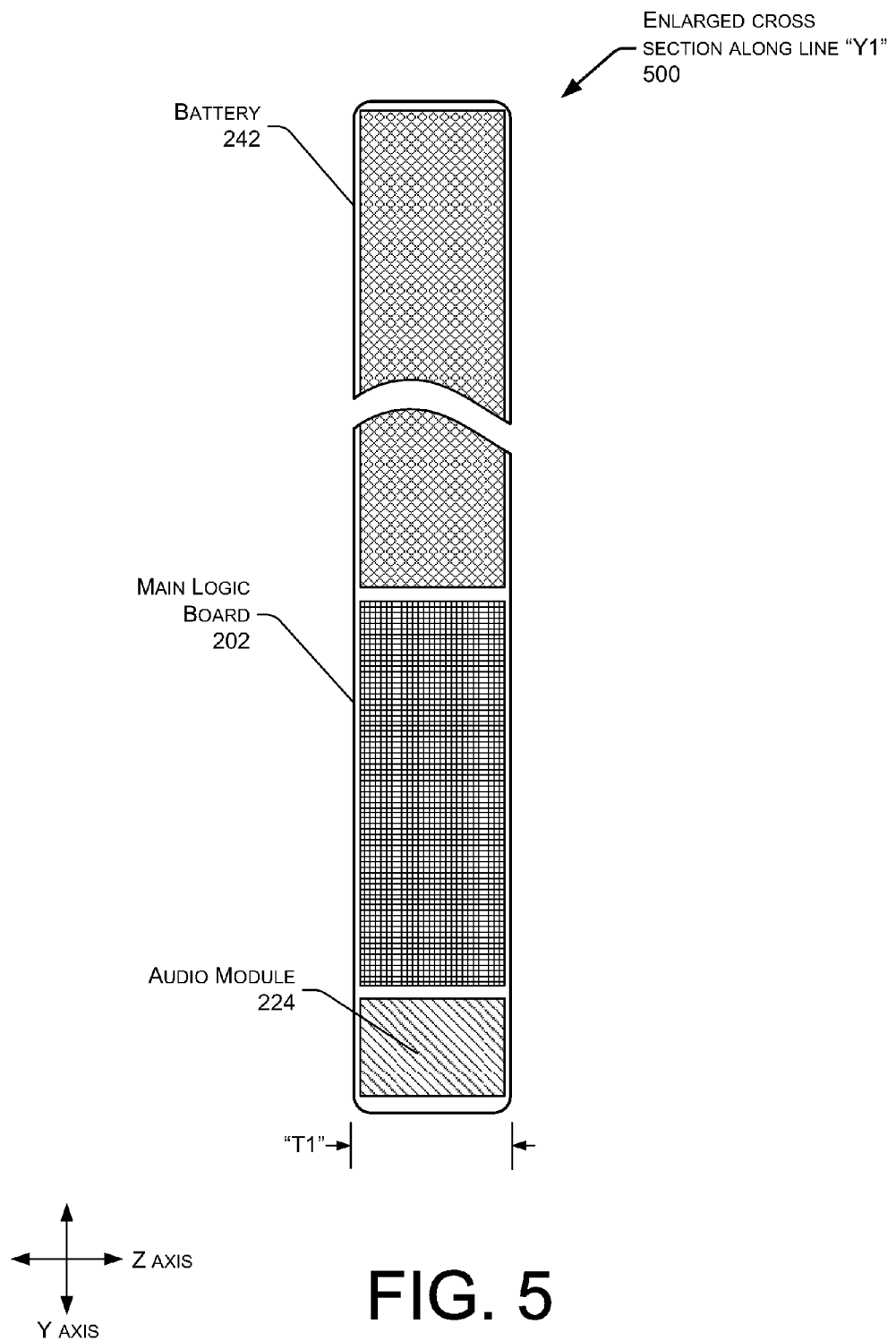
FIG. 5 is an illustration of an enlarged cross section of the eBook reader device of FIG. 3 along line "Y1" within the first panel.

FIG. 5 is an illustration of an enlarged cross section 500 of the eBook reader device of FIG. 3 along line "Y1" within the first panel 104. In this cross section, the battery 242 is positioned above the main logic board 202, which in turn is positioned above the audio module 224.

Dimension "T1" indicates the overall thickness of the device along this cross sectional line "Y1." By using the second panel 106, which contains components such as the display 210, as a cover, the overall thickness "T1" is reduced, resulting in a very slim profile for the device 100. In some implementations, some or all active components of the device may be distributed within one or more panels such that they are not located behind the display 210. Also, within some implementations active components within each panel may be distributed such that they are coplanar with one another, resulting in a mono-layer layout. This mono-layer distribution further reduces the overall thickness of the device.

Figure 6:
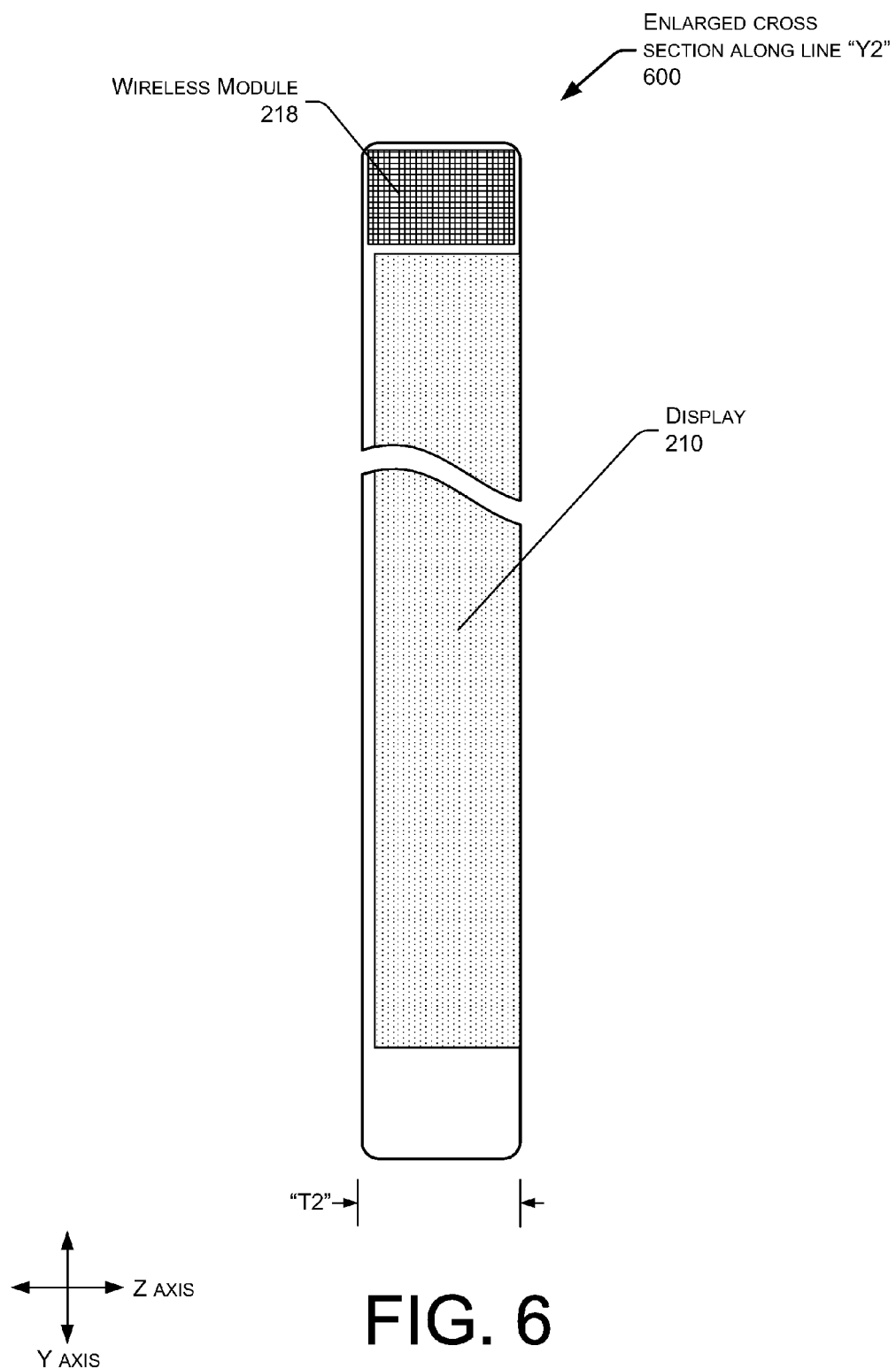
FIG. 6 is an illustration of an enlarged cross section of the eBook reader device of FIG. 3 along line "Y2" within the second panel.

FIG. 6 is an illustration of an enlarged cross section 600 of the eBook reader device of FIG. 3 along line "Y2." In this cross section, the wireless module 218 is shown above the display 210. Also shown is dimension "T2" which indicates the overall thickness of the device along the cross sectional line "Y." In the eBook reader device 100 shown, dimension "T1" about equals dimension "T2." In other implementations T1 and T2 may differ. For example, T1 may be about 2.1 millimeters (mm) while T2 may be about 4.0 mm.

Figure 7:
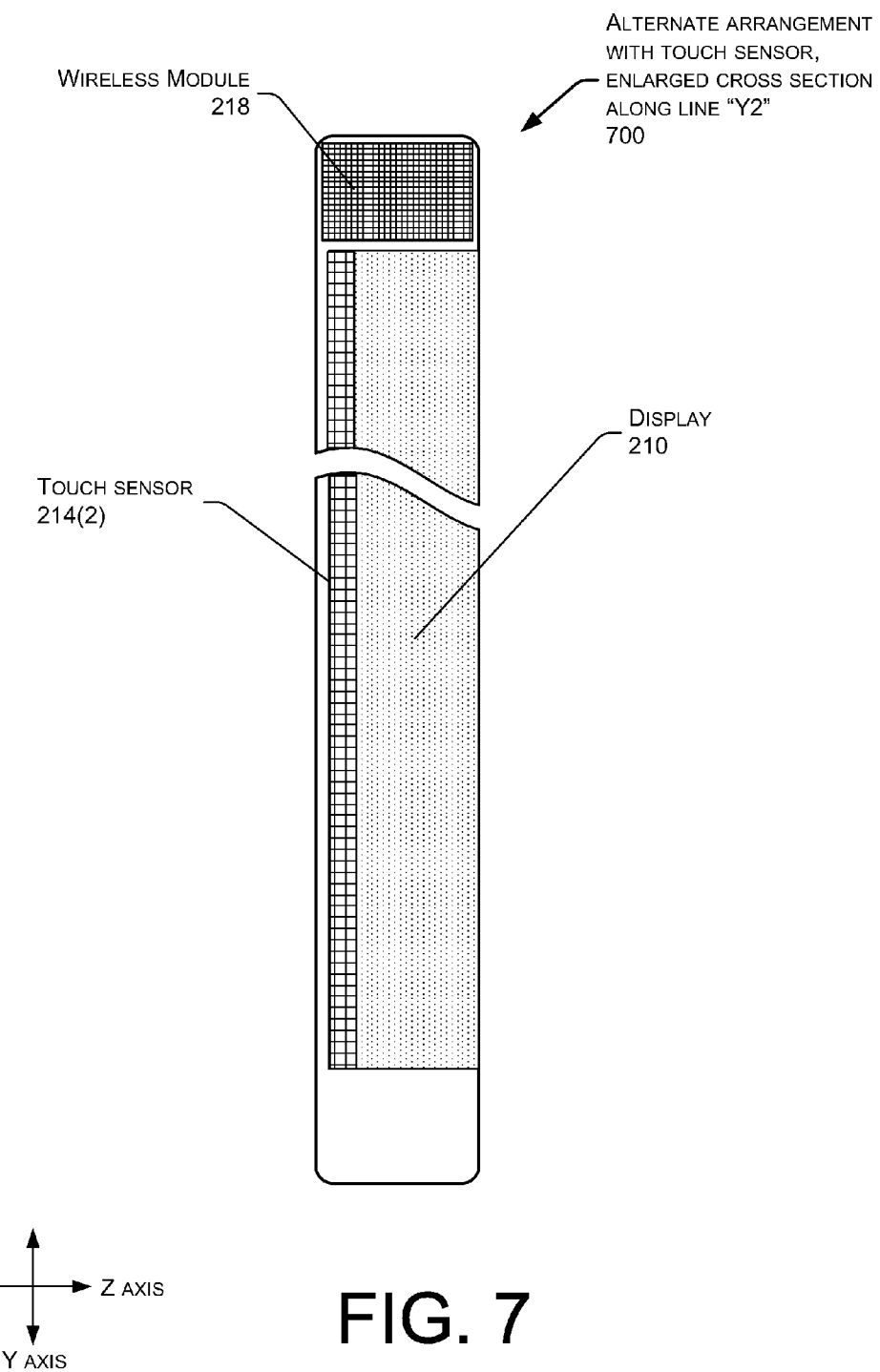
FIG. 7 is an illustration of an enlarged cross section along line "Y2" of an alternate arrangement of the eBook reader device of FIG. 3 which includes a touch sensor.

FIG. 7 is an illustration of an enlarged cross section 700 along line "Y2" of an alternate arrangement the eBook reader device of FIG. 3. In this arrangement, a touch sensor 214(2) has been added to display 210 to provide for a touchscreen. The touch sensor 214(2) may be disposed behind the display 210, as shown here, while in other implementations the touch sensor 214(2) may be disposed in front of the display 210.

Figure 8:
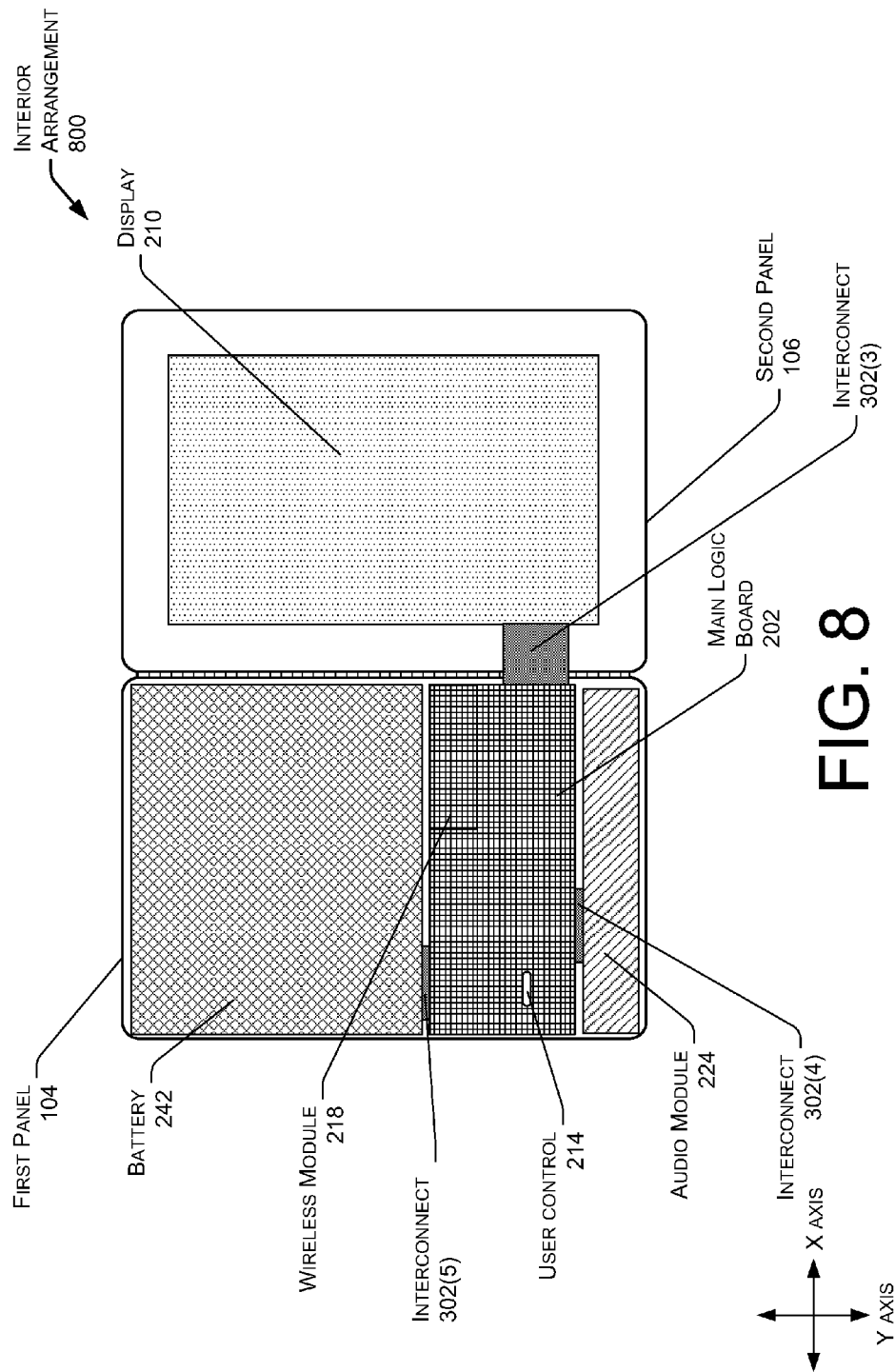
FIG. 8 is an illustration of an alternative internal arrangement of an eBook reader device showing placement of components within the panels.

FIG. 8 illustrates an alternative internal arrangement 800 of an eBook reader device showing placement of components within the panels. In this alternative internal arrangement 800, the first panel 104 contains the battery 242, the main logic board 202, the wireless module 218, the user control 214 (such as a power button), and the audio module 224. As depicted, the battery 242 occupies a substantial portion of the volume of the first panel 104. In some implementations, the battery may occupy at least about 50% of the available volume of a panel. Presence of such a large battery 242 provides for convenience of use and extended operational times between recharging. For example, in an academic setting the large capacity of battery 242 may result in student's recharging their eBook reader devices less frequently, perhaps once every week or two. In other implementations the battery 242 may be smaller, for example occupying less than 50% of the available volume, while in other implementations power may be provided from an external source and the battery 242 may be omitted entirely.

Here, the second panel 106 contains the display 210. In this implementation, the display 210 incorporates a touchscreen. Use of a touchscreen may reduce the need for other user controls 214. For example, inputs made to the touchscreen may be used to change pages rather than a user pressing a page turn button.

As described above with respect to FIG. 1, when the display 210 is not in use, the first panel 104 may be rotated about hinge 106 such that first panel 104 obscures display 210, as shown in the closed state 110. While in the closed state 110, the eBook reader device 100 may still remain functional, either in a full power or in a reduced power or state retention mode. For example, the eBook reader device 100 may be downloading an eBook via the wireless module 218 while closed.

Hinge 106 may be configured to allow the first panel to be positioned such that it is completely behind the second panel while the display 210 is in use. Particularly when combined with a touchscreen, this presents a clean and unobstructed perimeter around the display 210 suitable for grasping or other physical manipulations of the device by the user.

Components or structures may incorporate multiple functions, or have other components embedded within. For example, the battery 242 may have an antenna 222 integrated into at least a portion of the battery 242 surface. Or antenna 222 may be incorporated into a portion of the exterior case 112. In another example, the audio module 224 may include audio processing circuitry in addition to the microphone 226 and one or more speakers 228.

Figure 9:
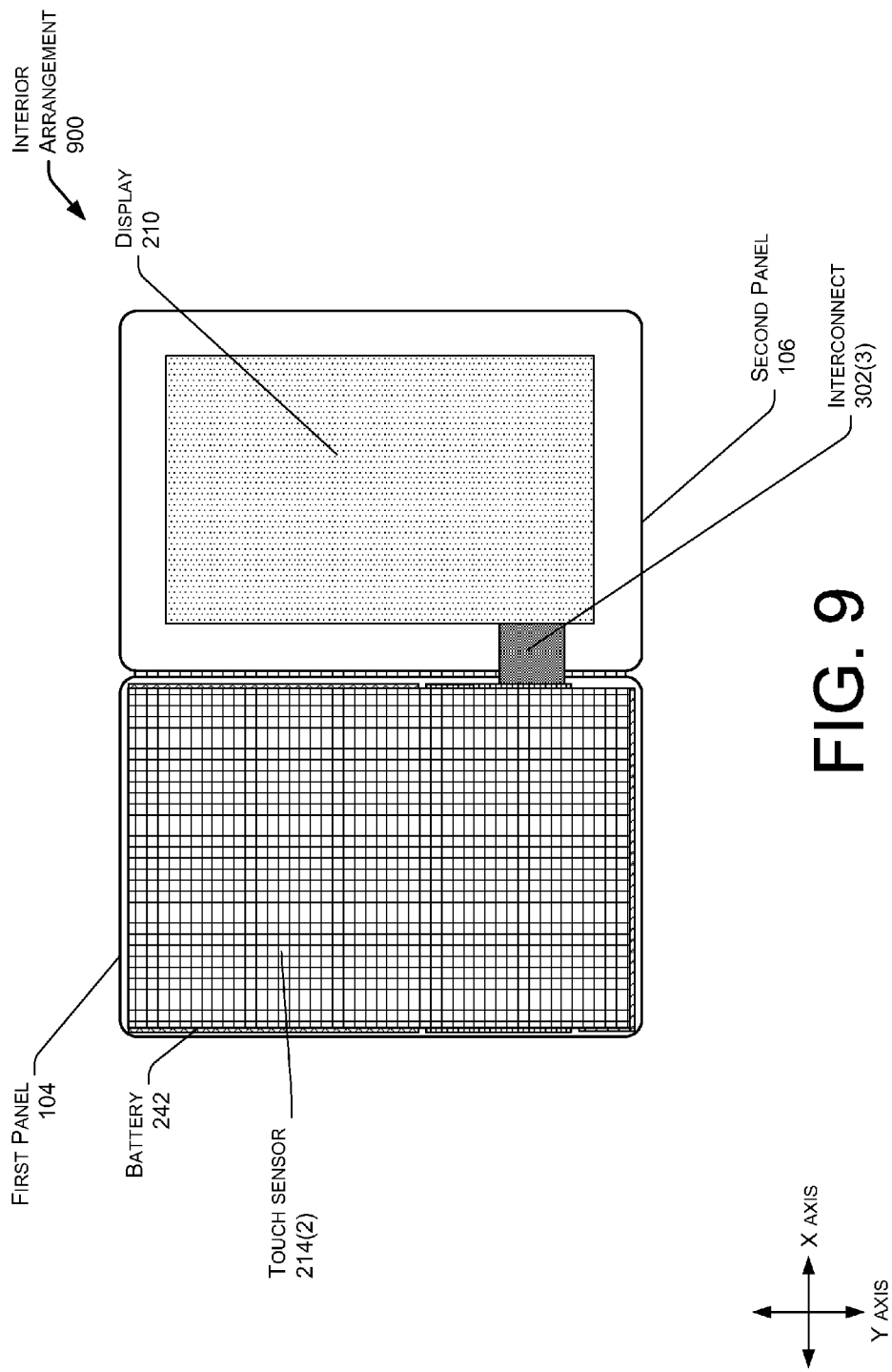
FIG. 9 is an illustration of an alternative internal arrangement of an eBook reader device showing placement of components within the panels and a touch sensor on the first panel.

FIG. 9 is an illustration of an alternative internal arrangement 900 of an eBook reader device. In this alternative arrangement, the first panel 104 includes the touch sensor 214(2). With this arrangement, a user may thus be viewing content such as an eBook on the display 210 in the second panel 106 while making annotations or entering commands on the touch sensor 214(2) in the first panel 104. In some implementations the display 210 may also incorporate an additional touch sensor 214(2), producing a touchscreen display, allowing for dual input via the touch sensor 214(2) in the first panel 104 and the touchscreen of the display 210 in the second panel 106.

Figure 10:
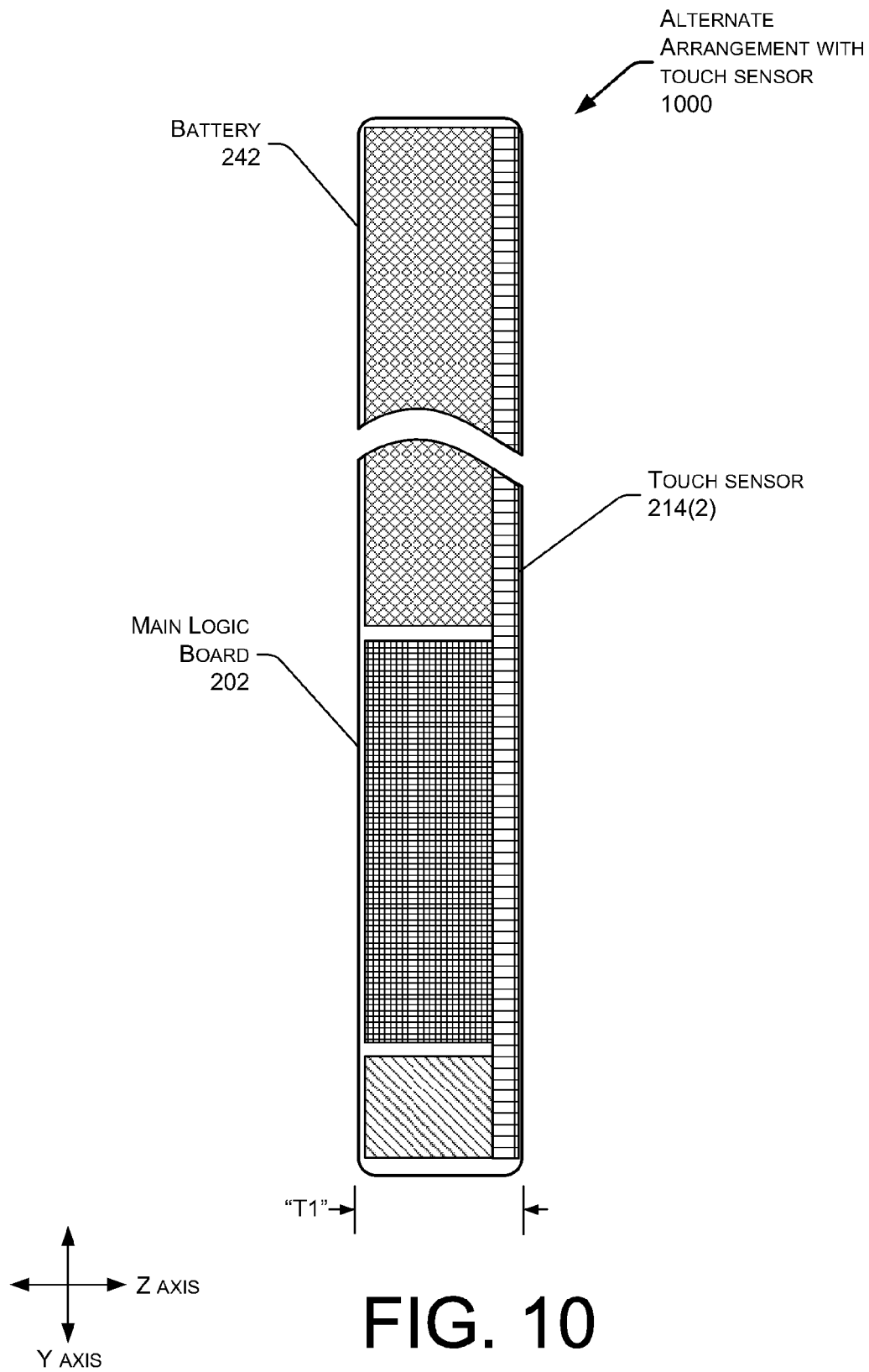
FIG. 10 is an illustration of an enlarged cross section of an alternate arrangement of the first panel of the eBook reader device of FIG. 9 which includes a touch sensor.

FIG. 10 is an illustration of an enlarged cross section 1000 along the Y axis of the first panel of the eBook reader device of FIG. 10. In this alternate arrangement, the touch sensor 214(2) has been arranged on the interior face of the first panel, such that in the open flat state 400 the touch sensor 214(2) is accessible to the user. In some implementations the touch sensor 214(2) may be in a plane substantially parallel to the active components within the panel, as shown here in FIG. 10. In such an implementation, the dimension T1 may increase to accommodate the increased height of the touch sensor 214(2). In other implementations the touch sensor 214(2) may be substantially coplanar with or integrated into the active components within the panel.

Figure 11:
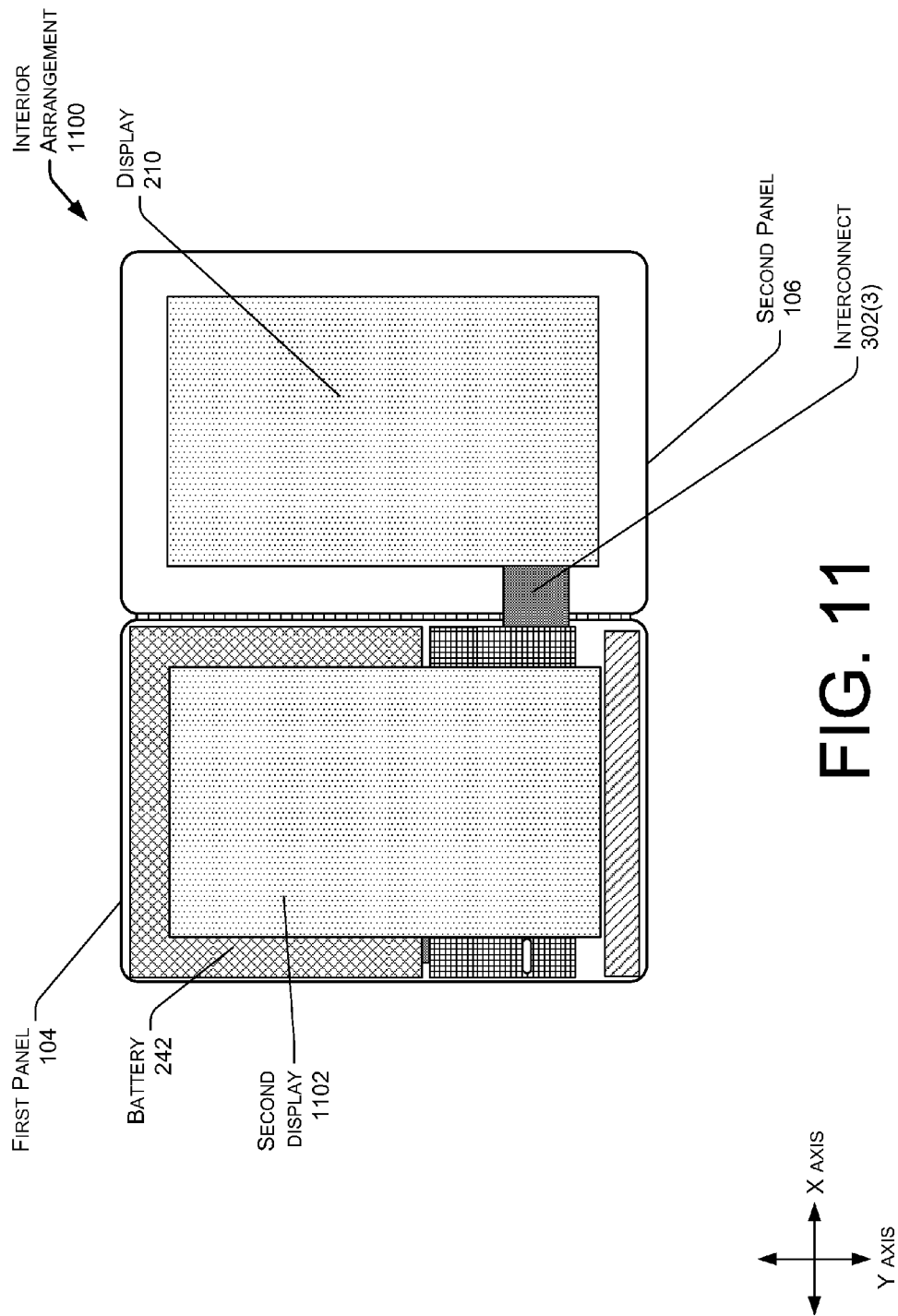
FIG. 11 is an illustration of an alternative internal arrangement of an eBook reader device showing placement of components within the panels and a second display on the first panel.

FIG. 11 is an illustration of an alternative internal arrangement 1100 of an eBook reader device. In this alternative arrangement, the first panel 104 includes a second display 1102. The second display 1102 may be the same or different from the display 210 in the second panel 106. For example, the second panel display 1102 may comprise an emissive display while the display 210 in the second panel 106 comprises a reflective display. Furthermore, the size and shape of the two displays may differ from one another. In some implementations, one or both of the displays may incorporate a touch sensor 214(2), thus providing touchscreen input capabilities.

Figure 12:
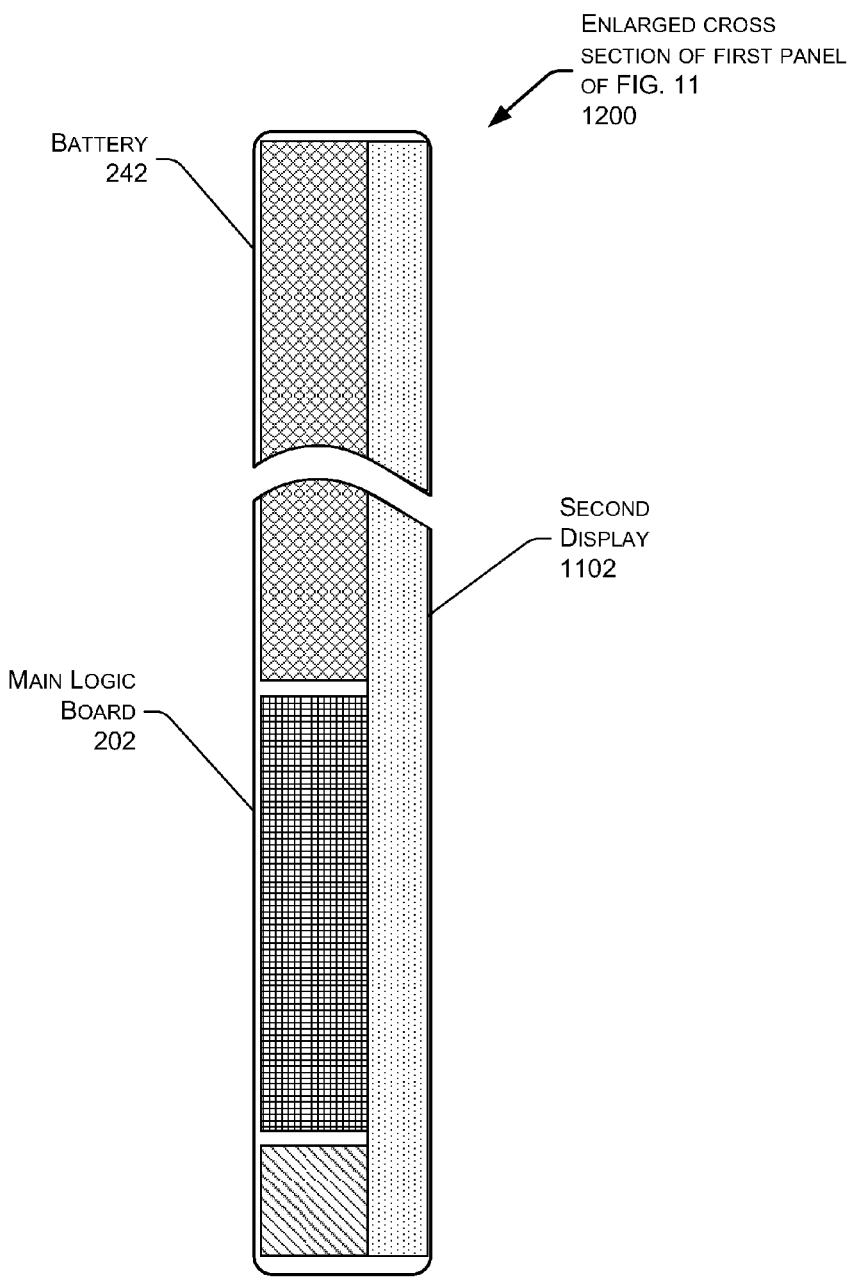
FIG. 12 is an illustration of an enlarged cross section along the Y axis of the first panel of eBook reader device of FIG. 11 depicting the additional display.
Figure 12:
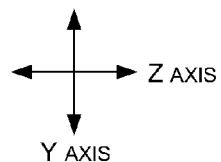

FIG. 12 is an illustration of an enlarged cross section of the first panel of the eBook reader device of FIG. 11 along the Y axis. In this arrangement, the second display 1102 is shown within the first panel 104.

In some implementations the second display 1102 may be in a plane substantially parallel to the active components within the panel, as shown here in FIG. 12. In such an implementation, the height of the second display may increase to accommodate the increased height of the second display 1102. In other implementations the second display 1102 may be substantially coplanar with or integrated into the active components within the panel.

Figure 13:
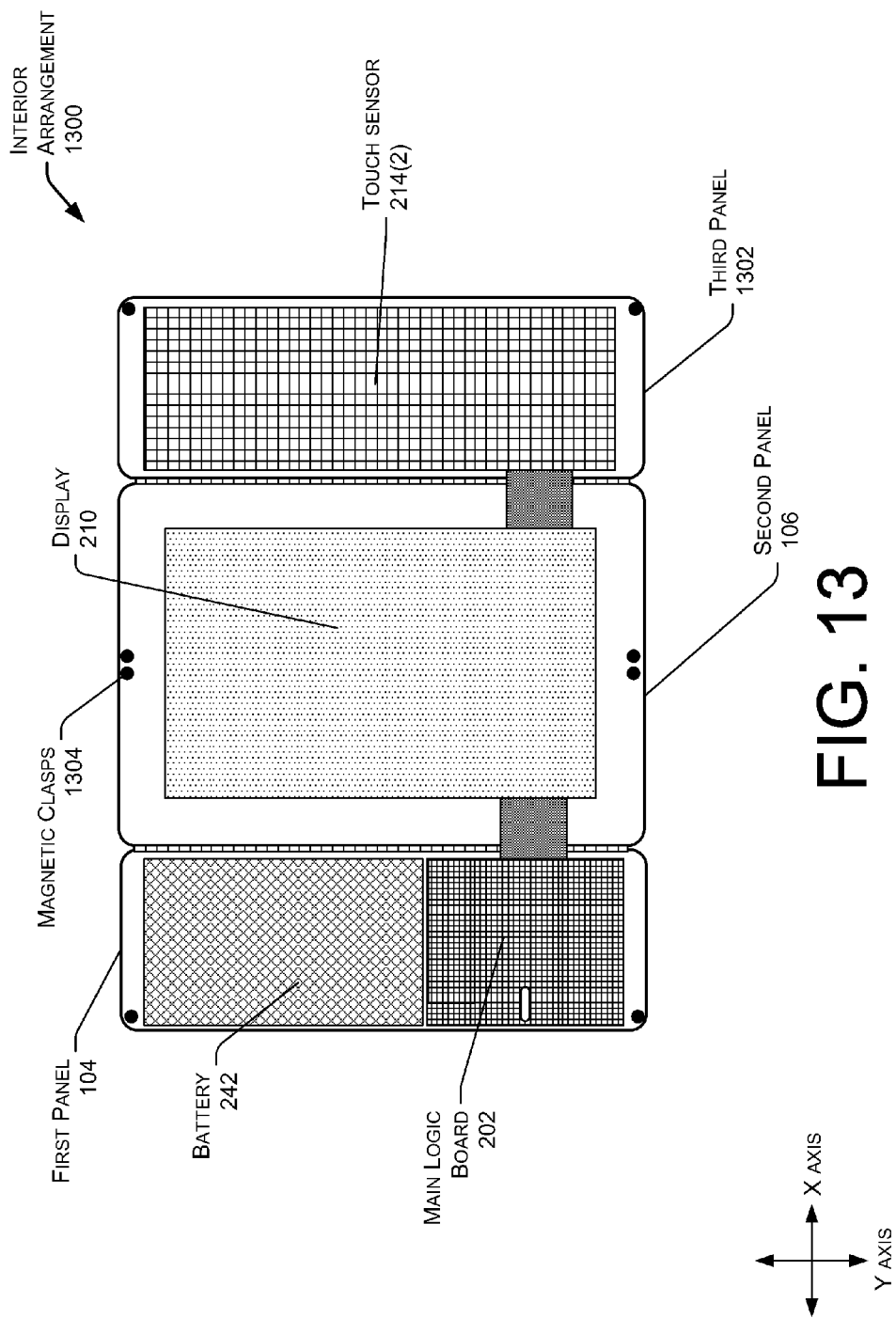
FIG. 13 is an illustration of an example internal arrangement of components within an eBook reader device having three panels.

FIG. 13 is an illustration of an example internal arrangement 1300 of components of an eBook reader device having three panels. In this arrangement, the first panel 104 contains the battery 242, the main logic board 202, the wireless module 218, and so forth. The second panel 106 contains the display 210 as described above. A third panel 1302 is shown attached to the second panel 106 via a second hinge 106. The third panel 1302 may incorporate a touch sensor 214(2), an additional battery 242, and so forth. In other implementations, the components may be distributed differently amongst the panels, for example, the wireless module 218 may be located in the third panel 1302. One or more interconnects couple the components within the third panel 1302 to the components in first panel 104, the second panel 106, or both.

When rotated about the hinges 106, the first panel 104 and the third panel 1302 may be held in place by magnetic clasps 1304 as shown here. In other implementations latches and so forth may be used to maintain a position of the first panel 104, the third panel 1302, or both relative to the second panel 106.

FIGS. 14A-14D illustrate enlarged cross sections of the eBook reader device of FIG. 13 in various physical arrangements. FIG. 14A depicts the eBook reader device of FIG. 13 in an open flat state 1400. Here, the panels of the device are disposed to form a substantially planar overall arrangement. For example, the eBook reader device may be lying on a surface such as a student's desk, ready for studying.

FIG. 14B depicts the eBook reader device of FIG. 13 in a freestanding state 1402. In this free standing state 1402, the first panel 104 and third panel 1302 have been rotated about their respective hinges such that these panels are no longer substantially planar to one another. In the freestanding state 1402, the eBook reader device may be set up on a table or other suitable surface, such that the Y axis of the device of the device is generally orthogonal to the plane of the surface upon which it sits.

In one example, suppose a student is following a lesson in class on the eBook reader device. The student may partially fold the first and third panels into this freestanding state 1402, and set the device upright, allowing the student to sit back and watch the presentation on the eBook reader device more comfortably.

FIG. 14C depicts the eBook reader device of FIG. 13 in a closed with the display covered state 1404. In this arrangement, the first 104 and third 1302 panels have been folded over the second panel 106 containing the display, such that at least a portion of each panel obscures the second panel 106. In this arrangement, the device may be safely stored and transported, minimizing risk of damage to the components upon the interior surfaces of the device, such as the display 210 and touch sensor 214(2).

FIG. 14D depicts the eBook reader device of FIG. 13 in an open with side panels behind the display state 1406. In this arrangement, the first 104 and third 1302 panels have been folded behind the second panel 106 containing the display. In this arrangement, the user thus only sees the second panel 106. Such an arrangement may more convenient to the user in certain circumstances, such as minimizing desk space during a laboratory experiment while only referring to material on the display 210.

Figure 15A:
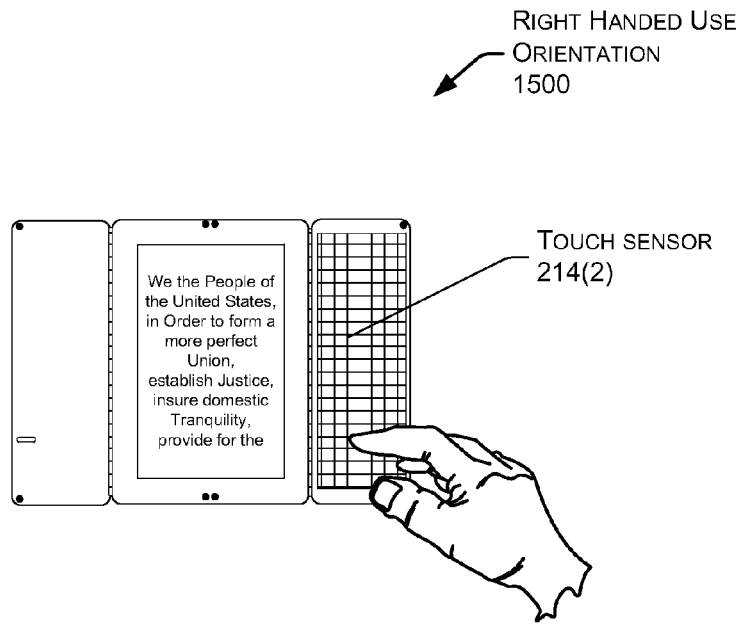
FIGS. 15A and B illustrate the eBook reader device with three panels as used by right- and left-handed users.

FIGS. 15A and B illustrate the eBook reader device with three panels as used by right- and left-handed users. A significant portion of the population is left-handed, that is, their left hand dominates for writing or other fine motor control tasks such as using a touch sensor, moving a mouse, and so forth. One benefit of the devices described herein is that they may be adapted for use by left or right-handed individuals by re-orienting the device. The orientation of the device relative to the user may either be specified manually such as through a user control presented via a user interface, via input from sensors such as an accelerometer or camera, or via analysis of user input such as the writing of text or a character on a touch sensor 214(2).

FIG. 15A shows the device in a right handed orientation 1500 with a right-handed user interacting with the device. In this orientation, the touch sensor 214(2) is conveniently positioned to the right of the display 210.

Figure 15B:
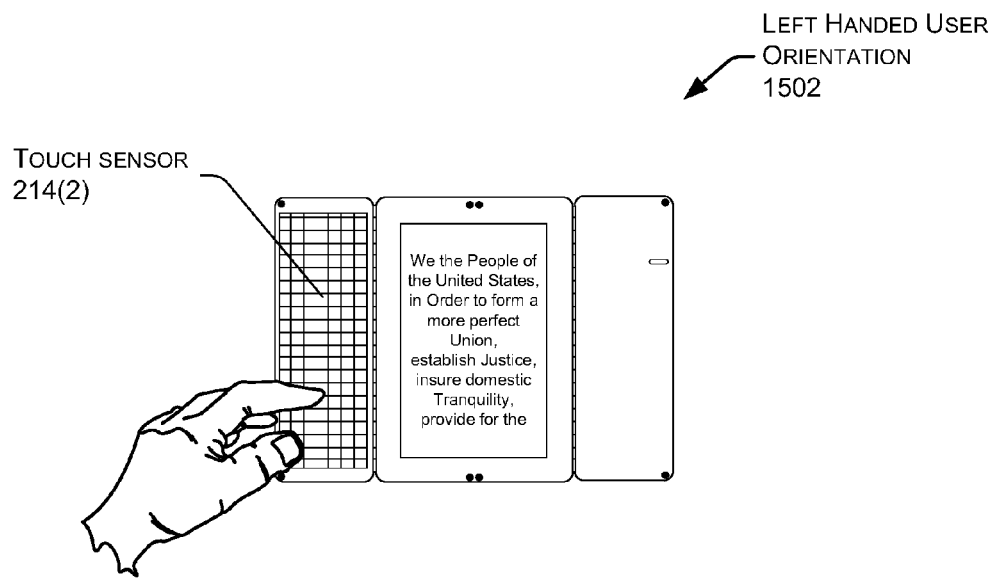

FIG. 15B shows the same device, but now in the left handed orientation 1502. The left-handed user has rotated the device such that the touch sensor 214(2) is now more conveniently placed to the left of the display 210. Because of this re-orientation, the text presented on the display has been adjusted, such that it is in the proper orientation for reading by the left-handed user.

While the re-orientation and adaptation of the device between left- and right-handed users has been shown with respect to the electronic device having three panels, this re-orientation and adaptation may be applied to any of the arrangements and configurations shown herein. Thus, the two panel arrangement with dual displays as shown within FIG. 11 may be similarly re-oriented.

Illustrative Process for Assembling a Reduced Height Device

Figure 16:
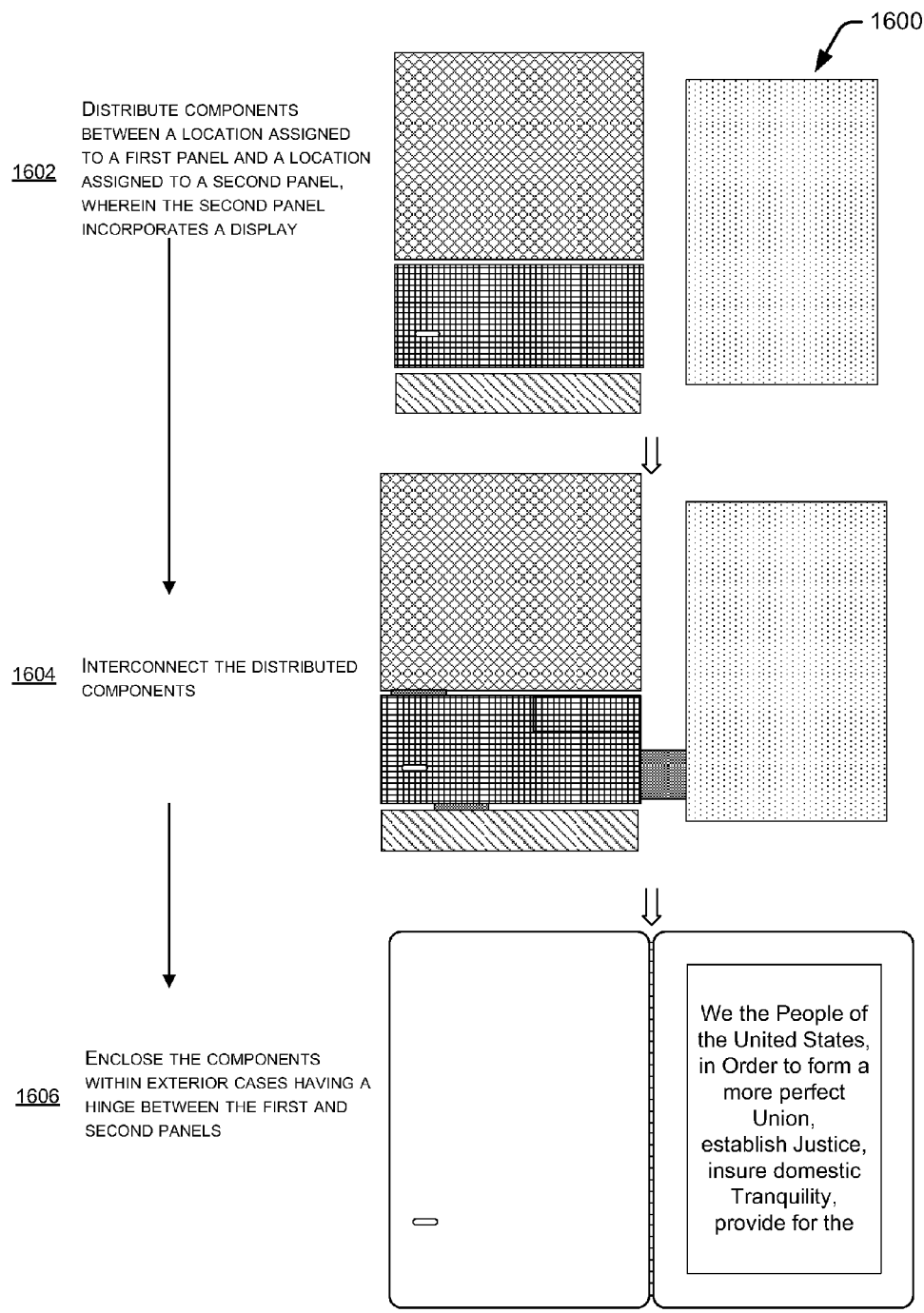
FIG. 16 is an illustrative process of assembling a hinged electronic device having multiple panels with active components disposed therein.

FIG. 16 illustrates an example process 1600 that may be implemented by the architecture of FIGS. 1-14 or by other architectures. This process is illustrated as a collection of blocks in a logical flow graph, which represent a sequence of operations that can be implemented in hardware, software, or a combination thereof. In the context of software, the blocks represent computer-executable instructions that may be stored on one or more computer-readable storage media and that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

FIG. 16 is an illustrative process 1600 of assembling a hinged electronic device having multiple panels. Operation 1602 distributes components for a first panel and a second panel. The second panel includes a display component, or both panels may include a respective display component. Components may be distributed manually, using a pick-and-place device or other automated equipment, or a combination of both.

Operation 1604 interconnects the components. Interconnection may be accomplished via soldering, mechanical insertion, physical contact, adhesion, and so forth. As described above, interconnections provide a coupling between two or more components.

Operation 1606 encloses components within exterior cases for the first panel and second panel respectively. The exterior cases are configured to accept a hinge. In some implementations the components may be distributed directly within one or more portions of previously formed exterior cases. In other implementations, the components may be encased at least partially in an encapsulating material, for example, a plastic or epoxy. Furthermore, in some implementations, operations 1604 and 1606 may comprise a single operation, where the components are interconnected via enclosing the components within the exterior cases.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims For example, the methodological acts need not be performed in the order or combinations described herein, and may be performed in any combination of one or more acts.

What is claimed is:

1. A handheld electronic book reader device, comprising:
   a first panel including a main logic board and at least one other active component arranged substantially coplanar with the main logic board;
   a second panel including a display component;
   a third panel including at least one active component;
   an interconnect coupling the main logic board with the display component; and
   a first hinge connecting the first panel and second panel, a second hinge connecting the second panel and third panel, and the first and second hinges operable by a user to adjust the handheld electronic book reader device between a closed state and an open state such that:
      when the handheld electronic book reader device resides in the closed state, the first panel obscures from the user at least a portion of the display component on the second panel and the third panel obscures from the user at least a portion of the display component on the second panel; and
      when the handheld electronic book reader device resides in the open state, the display component is visible to the user.

2. The device of claim 1, wherein a tplane of the main logic board is defined by the length and width of the main logic board.

3. The device of claim 1, wherein the least one other active component consumes, stores, or produces electrical power.

4. The device of claim 1, wherein the second panel further includes a wireless module substantially coplanar with the display component, and further comprising a second interconnect coupling the wireless module to the main logic board.

5. The device of claim 1, wherein the at least one other active component within first panel comprises a battery configured to provide operational electrical power to the main logic board and the display component, and further comprising a second interconnect coupling the battery to the main logic board.

6. The device of claim 5, wherein the battery occupies at least about 50% of an internal volume of the first panel.

7. The device of claim 1, wherein the second panel is free from an active component residing behind the display component.

8. The device of claim 1, wherein the second panel includes at least one other active component, the at least one other active component within the second panel is substantially coplanar with the display component within the second panel, and the least one other active component within the second panel consumes, stores, or produces electrical power.

9. The device of claim 1, wherein the display component comprises a reflective display.

10. The device of claim 9, wherein the reflective display comprises an electrophoretic display.

11. The device of claim 1, wherein an interconnect between the main logic board and the at least one other active component within the first panel is integral with the one or more active components within the first panel.

12. The device of claim 1, wherein an interconnect between the main logic board and another component within the second panel is at least partially integral to the display component or another component within the second panel.

13. The device of claim 1, wherein the at least one other active component of first panel further comprises:
   a touch sensor;
   a wireless module;
   an audio module;
   a battery; or
   a second display.

14. The device of claim 1, wherein the second panel further includes a second active component substantially coplanar with the display component, the second active component comprising:
   a secondary board;
   a wireless module;
   an audio module; or
   a battery.

15. The device of claim 1, wherein the interconnect comprises:
   an electrical conductor;
   an optical path; or
   an electromagnetic waveguide.

16. The device of claim 1, wherein when the handheld electronic book reader device resides in the closed state, the first and third panels each partially obscure the display component on the second panel from the user and the first and third panels obscure substantially all of the display component on the second panel from the user in the closed state.

17. An electronic book reader device comprising:
   a first panel comprising active components substantially coplanar with one another, the active components including a main logic board and a battery component configured to provide operational electrical power to operate the main logic board and a display component;
   a second panel including the display component powered by the battery component;
   a hinge coupling the first panel to the second panel and permitting the first panel to at least partially cover the display component within the second panel;
   a third panel including at least one active component; and
   a hinge coupling the second panel to the third panel and permitting the third panel to at least partially cover the display component within the second panel.

18. The device of claim 17, wherein a plane of each of the active components is defined by a top two longest orthogonal linear dimensions of the component.

19. The device of claim 17, further comprising an interconnect configured to couple the battery in the first panel to one or more components within the second panel.

20. The device of claim 17, wherein the display component comprises an electrophoretic display.

21. The device of claim 17, wherein the first or second panel or both include one or more active components comprising circuit boards arranged substantially coplanar to other active components within each panel, the circuit boards comprising:
   a processor;

an image processing unit;
an input device controller;
a universal serial bus host controller;
an external memory interface;
a memory;
a wireless modem; or
an antenna.

22. The device of claim 21, wherein the circuit boards comprise the wireless modem, and wherein the wireless modem is configured to establish a wireless wide area networking connection.

23. The device of claim 17, wherein the battery component couples to the display component via one or more interconnects.

24. The device of claim 17, wherein when the electronic book reader device resides in a closed state, the first and third panels each partially cover the display component within the second panel and the first and third panels cover substantially all of the display component within the second panel in the closed state.

25. A method of assembling a hinged electronic book reader device having multiple panels, the method comprising:
distributing a display component to a first panel and a plurality of different components to a second panel and a third panel, such that multiple different components are distributed to the second panel and at least one of the different components is distributed to the third panel and the multiple different components within the second panel are substantially coplanar to one another;
interconnecting the display component and the plurality of different components; and
enclosing the display component and the plurality of different components within an exterior case having a first hinge connecting the first and second panels and a second hinge connecting the first and third panels, the first hinge permitting the second panel to at least partially obscure the display component in a closed position, and the second hinge permitting the third panel to at least partially obscure the display component in the closed position.

26. The method of claim 25, wherein each of the plurality of different components consume, store, or produce electrical power.

27. The method of claim 26, wherein the exterior case comprises a pre-formed shell.

\* \* \* \* \*